E. G. BAILEY.
PRESSURE GAGE.
APPLICATION FILED AUG. 11, 1914.
1,123,164.
Patented Dec. 29, 1914.
Fig. 1.
Fig. 2.
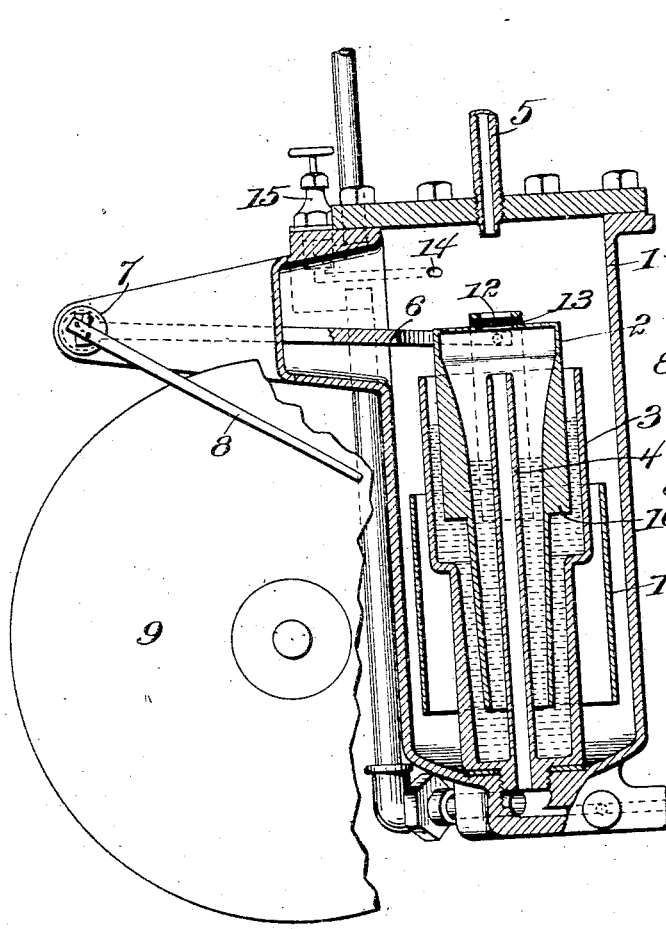
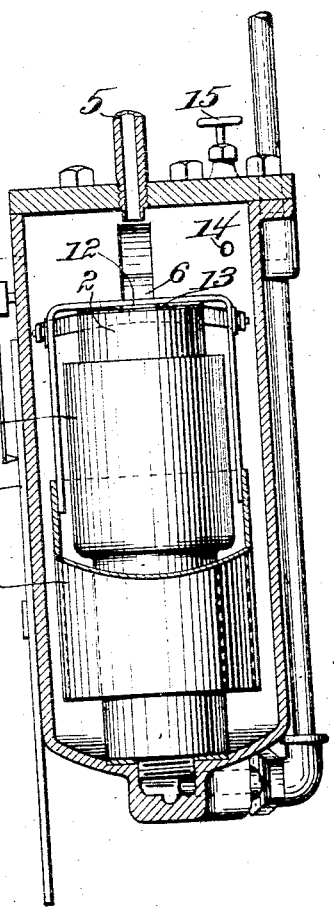
Witnesses:
Jas. J. Maloney
M. L. Maloney
Inventor,
Ervin G. Bailey,
by ___ Atty

UNITED STATES PATENT OFFICE.

ERVIN G. BAILEY, OF NEWTON, MASSACHUSETTS.

PRESSURE-GAGE.

1,123,164.   Specification of Letters Patent.   Patented Dec. 29, 1914.

Application filed August 11, 1914. Serial No. 856,237.

*To all whom it may concern:*

Be it known that I, ERVIN G. BAILEY, a citizen of the United States, residing in Newton, in the county of Middlesex and State of Massachusetts, have invented an Improvement in Pressure-Gages, of which the following description, in connection with the accompanying drawings, is a specification, like letters on the drawings representing like parts.

The present invention relates to a pressure gage and is embodied in an instrument for indicating and recording variations in pressures, the instrument being particularly adapted for use in connection with fluid flow meters.

The purpose of the invention is to simplify to the greatest extent possible the construction and arrangement of such an instrument and at the same time to eliminate friction so far as is possible so that the instrument is very sensitive and therefore highly efficient.

A further feature of the invention consists in providing the instrument with means whereby an excessive pressure difference due, for example, to the breaking of a pipe or to any other cause, will be counteracted in such a way as to prevent damage.

Figure 1 is a front elevation, partly in section, showing an instrument embodying the invention; and Fig. 2 is a transverse section through the middle of Fig. 1.

The instrument embodying the invention consists of a casing or chamber 1 which is adapted to receive the full pressure of the steam or of any other fluid which is to be metered. Within the chamber is a pressure receiving bell 2 which is submerged in a liquid, preferably mercury, contained in a chamber 3, the interior of said bell being adapted to receive pressure through an inlet pipe 4 extending through the mercury in the reservoir to the interior of the bell; while the exterior of the bell receives pressure on the outside which is admitted to the chamber 1 through a pipe 5. The bell 2 is connected with an oscillatable beam or lever 6 which has a pivotal bearing consisting of a spindle extending through suitable pressure tight bearings 7 to the outside of the casing, the said spindle having connected therewith an indicating pointer 8 which is shown as adapted to be provided with a pen which marks a rotating chart 9 for recording purposes. The walls of the bell 2 are of material thickness, as indicated at 10, so that the change in the buoyancy of the bell as it moves into or out of the mercury eventually will balance the change in force due to pressure acting on the bell. The position of the indicator 8 which is moved in response to the movement of the bell, is therefore, a measure of the pressure difference necessary to bring about the state of equilibrium aforesaid. In order to obviate the necessity of the use of guides or other devices which are productive of objectionable friction, the bell is arranged to be held in its vertical position under all conditions of pressure, by means of an external weight 11 which is outside of the sealing liquid and is connected with the bell in such a way that its center of gravity is always below the center of buoyancy of the bell, thereby causing equilibrium of flotation of the bell at all times. If it is desired to bring about a state of equilibrium when the indicator 8 shows a reading which varies, not directly with the pressure difference, but as some function thereof, such as the functional relation between the velocity head and rate of flow of fluids, the wall of the bell may be shaped as indicated so that the horizontal cross-sectional area of the said wall at the surface of the liquid progressively varies as the bell moves, thereby modifying the change in buoyancy due to such movement. It is obvious, however, that the bell and its walls may be of any known or desired shape according to the reading which is desired, and it is to be understood that no claim is made involving the peculiar shape of this bell.

In order to prevent accidents due to an abnormal excess of either pressure, over the other, which might result in blowing out the liquid which seals the bell, I have provided the instrument with means whereby the extreme movement of the bell in either direction will close one of the pressure pipes, thereby trapping the excess pressure and stopping the normal operation of the instrument. As a simple expedient for this purpose, I have shown the pressure inlet pipes 4 and 5 as in line with each other and in line with the axis of the bell, the said bell being provided at the outside with a valve member 12 and at the inside with a valve member 13 which are adapted to coöperate respectively with the ends of the inlet ducts 5 and 4. As the instrument is commonly used, the pressure medium contained in the casing 1 is water, which is non-compressible. It being obvious therefore that if either pressure is in excess of the other and the passage for the other is stopped, the excess pressure will be trapped, so that the mercury in which the bell is submerged cannot be blown out of the receptacle. Assuming, however, that a compressible medium is employed instead of a liquid, the compression will be sufficient to overcome the excess pressure in all ordinary cases before the mercury can be displaced so as to cause damage. I have provided the casing 1 with a passage 14 controlled by a valve 15 whereby communication can be established between the ducts through which pressure is delivered to the inside and the outside of the bell respectively so as to bring about a state of equilibrium between the pressures.

What I claim is:

1. In a pressure gage, the combination with a pressure receiving bell sealed in a liquid and having walls of sufficient thickness to bring about a state of equilibrium due to the buoyant effect of the sealing liquid on the said bell; of an oscillatable beam to which said bell is connected; and a weight connected with said bell and outside of the liquid in which said bell is sealed, the center of gravity of said weight being below the center of gravity of said bell.

2. In a pressure gage, the combination with a pressure receiving bell sealed in a liquid, the walls of said bell constituting a displacing member adapted to bring about a state of equilibrium in response to changes in buoyancy due to the movement of the bell in the liquid; of an oscillatable beam to which said bell is connected; and a weight associated with said bell and so located with relation thereto that the center of gravity of the bell and weight is always below their center of support.

3. A pressure gage comprising a liquid sealed bell; a pressure receiving casing containing said sealed bell; a pressure duct opening into the space within the said bell and above the sealing liquid, the outer edges of said duct also forming a stop upon which the said bell rests when at its lower limit of motion; another pressure duct opening into the space above the bell, the lower edges of said duct also forming a stop for said bell when at its uppermost limit of motion; and suitable surfaces on the outer and inner parts of said bell to seal whichever opening is engaged when there is an extreme movement of said bell.

4. In a pressure gage, the combination with a pressure receiving bell sealed in a liquid and having walls of sufficient thickness to bring about a state of equilibrium due to the buoyant effect of the sealing liquid on said bell; of an oscillatable beam to which said bell is connected; a weight connected with said bell and outside of the liquid in which said bell is sealed, the center of gravity of said weight being below the center of gravity of said bell; a casing containing said sealed bell; pressure pipes leading respectively into the said casing outside of the bell and through the sealing liquid to the inside of the bell; and means for closing either one of said pipes in response to an abnormal movement of the bell.

In testimony whereof, I have signed my name to this specification in the presence of two subscribing witnesses.

ERVIN G. BAILEY.

Witnesses:
JAS. J. MALONEY,
M. L. MALONEY.